United States Patent
Coulter et al.

(10) Patent No.: US 10,182,212 B2
(45) Date of Patent: *Jan. 15, 2019

(54) WIDE AREA INTERMITTENT VIDEO USING NON-ORTHORECTIFIED FEATURE MATCHING IN LONG PERIOD AERIAL IMAGE CAPTURE WITH PIXEL-BASED GEOREFERENCING

(71) Applicant: SAN DIEGO STATE UNIVERSITY RESEARCH FOUNDATION, San Diego, CA (US)

(72) Inventors: Lloyd Lawrence Arthur Coulter, Escondido, CA (US); Christopher Lippitt, Albuquerque, NM (US)

(73) Assignee: SAN DIEGO STATE UNIVERSITY RESEARCH FOUNDATION, San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/695,821

(22) Filed: Sep. 5, 2017

(65) Prior Publication Data

US 2018/0160080 A1 Jun. 7, 2018

Related U.S. Application Data

(63) Continuation of application No. 13/916,570, filed on Jun. 12, 2013, now Pat. No. 9,756,293.

(Continued)

(51) Int. Cl.
*H04N 7/18* (2006.01)
(52) U.S. Cl.
CPC .................................. *H04N 7/181* (2013.01)
(58) Field of Classification Search
CPC ...................................................... H04N 7/181
See application file for complete search history.

(56) References Cited

U.S. PATENT DOCUMENTS

| 9,756,293 B2 * | 9/2017 | Coulter | H04N 7/181 |
| 2004/0212678 A1 * | 10/2004 | Cooper | G08B 13/19602 |
| | | | 348/155 |
| 2006/0041375 A1 * | 2/2006 | Witmer | G01C 15/00 |
| | | | 701/532 |

OTHER PUBLICATIONS

Lloyd L. Coulter, Douglas A. Stow, and Sebastian Baer; A Frame Center Matching Technique for Precise Registration of Multitemporal Airborne Frame Imagery; Nov. 2003; IEEE Transactions on Geoscience and Remote Sensing, vol. 41, No. 11, p. 2436-2444 (Year: 2003).*

* cited by examiner

*Primary Examiner* — Tat C Chio
(74) *Attorney, Agent, or Firm* — Juneau & Mitchell; Todd L. Juneau

(57) ABSTRACT

This application relates to techniques for obtaining wide area intermittent video (WAIV). Some embodiments disclosed herein include a method of obtaining WAIV. The method can include, for example, capturing images at a series of sensor stations having pre-determined locations along a flightline. The flightline can be repeated one or more times, where images are captured at the same sensor stations with each pass of the flightline. The captured images from the same sensor station may have replicated view geometry and may be co-registered and precisely aligned with pixel-level precision. The captured images from multiple sensor stations through time may also be displayed together based upon absolute or relative sensor station locations to create a temporal sequence of wide area intermittent video. The approach provides efficient methods for creating wide area video with reduced temporal imaging frame rates. Systems and devices for forming wide area intermittent video are also disclosed.

13 Claims, 9 Drawing Sheets

Related U.S. Application Data

(60) Provisional application No. 61/689,860, filed on Jun. 13, 2012.

WIDE AREA INTERMITTENT VIDEO USING NON-ORTHORECTIFIED FEATURE MATCHING IN LONG PERIOD AERIAL IMAGE CAPTURE WITH PIXEL-BASED GEOREFERENCING

CROSS-REFERENCE TO RELATED APPLICATIONS

This application claims the benefit of priority to U.S. Application No. 61/689,860, filed Jun. 13, 2012, which is hereby incorporated by reference in its entirety.

This application is also related to U.S. application Ser. No. 13/676,854, filed Nov. 14, 2012, which is hereby incorporated by reference in its entirety.

STATEMENT REGARDING FEDERALLY SPONSORED RESEARCH

The invention was made with government support under DHS S&T NC-BSI Agreement Number 2008-ST-061-BS0002 awarded by the Department of Homeland Security (DHS). The government has certain rights in the invention.

FIELD

The present application relates, in some embodiments, to a method for creating wide area intermittent video (WAIV) and/or WAIV mosaics across large areas. This is accomplished using sensor station matching (e.g., returning a sensor, such as a camera, to the same absolute spatial position and viewing the same scene with about the same viewing geometry) and precise spatial co-registration of a series of multi-temporal airborne or satellite remotely sensed images (images collected without being in direct contact with features of interest; normally earth observation from aircraft and satellite platforms) on a frame-by-frame basis. When a temporal series of images are collected with approximately the same viewing geometry, precise (even pixel-level) spatial co-registration may be attained with ultra-high spatial resolution imagery (e.g., 3 inch spatial resolution) using simple techniques such as point matching and image transformation. Whereas traditional video collects one scene of interest with high temporal frequency (e.g., 30 times/second), imagery collected using the WAIV approach can be collected intermittently for multiple scenes of interest (e.g., over seconds, minutes, hours, days, weeks, months, and years) using a single platform/sensor or multiple platforms/sensors that repeat the same flight pattern. The fact that a sensor moves away from and later returns to sensor stations as part of the process of creating intermittent video can, in some embodiments, be a difference between WAIV and other airborne or satellite video imaging approaches. The WAIV approach has a range of applications with a range of imagery with different characteristics (e.g., spatial, spectral, radiometric, and temporal). For example, WAIV may be used with ultra-high spatial resolution (e.g., 3 inch) imagery for military intelligence purposes, or with 10 m spatial resolution thermal imagery for tracking the movement of wildfire intermittently over time.

BACKGROUND

Image registration can be utilized to transform a subject image so that it is geometrically aligned with a reference image and may generally include three steps: 1) feature matching, 2) transform model estimation, and 3) image resampling and transformation (Wyawahare, M. V., P. M. Patil, and H. K. Abhyankar 2009 Image registration techniques: an overview. International Journal of Signal Processing, Image Processing, and Pattern Recognition 2(3): 11-28; Zitova, B. and J. Flusser. 2003. Image registration methods: a survey. Image and Vision Computing, 21: 977-1000.). Feature matching can identify corresponding image coordinate sets between the images that may be used to estimate the transformation model. Transformation model estimation can be the process of estimating and possibly fine-tuning the transformation model in order to achieve accurate image co-registration. The derived transformation model may be the best estimate given available calibration information, and each observed control point (e.g., calibration point) is likely to have some level of residual error. Once a final transformation model is attained, the subject image may be transformed and resampled (converting subject image pixel values from the subject image grid to the reference image grid).

Feature-based matching may include feature detection with subsequent matching of detected features. Feature detection may be a process of identifying specific image features and characterizing these features using a range of possible descriptors. Feature selection may be based upon the characteristics of regions, edges, contours, line intersections, corners, etc. Feature matching generally utilizes a variety of information to compare image feature characteristics between image sets to identify feature pairs that meet specified matching criteria. Image coordinates from successfully matched feature pairs may be utilized to co-register the images.

For feature-based matching, the spatially invariant feature transform (SIFT) is a descriptor routine that has been widely used. SIFT generates a large number of feature points per image, and uses 128 unique feature descriptors in order to achieve robust matching of individual features between the subject and reference image (Lowe, D. 2004. Distinctive image features from scale-invariant keypoints. International Journal of Computer Vision, 60(2):91-110). Since it was first proposed, variations on the SIFT routine have been published. Other feature-based descriptors include Gaussian derivatives, moment invariants, and shape context. Matching features may be accomplished based on either feature descriptors or spatial relationships. Feature-based methods can handle images with intensity and geometric distortion differences, but they may yield too few or unevenly distributed matched points.

Area-based matching generally includes the comparison of local windows of image digital number (DN) values. These values could be based upon original image intensity or transformed image products. Area-based matching skips the feature detection step and directly searches for matching characteristics between pixel values of the subject and reference images. Area-based matching methods include: cross-correlation, least squares, mutual information, Fourier, maximum likelihood, statistical divergence, and implicit similarity matching. Area-based methods generally require initial, coarse alignment between images. Area-based methods yield sub-pixel matching accuracy, but may be less effective than feature-based approaches for images with repeating textures, illumination differences, or image distortions. Further, area-based methods also may not be appropriate for images collected from different locations and having wide baselines.

Transformation model estimation may include selecting a transformation model based upon the method of image acquisition, the assumed geometric deformation, and the required accuracy of the registration (Zitova, B. and J. Flusser. 2003. Image registration methods: a survey. Image and Vision Computing, 21: 977-1000). Global transformation models (single model applied across entire images) include affine, projective, polynomial-based approaches, each of which is applicable for specific situations (Zitova, B. and J. Flusser. 2003. Image registration methods: a survey. Image and Vision Computing, 21: 977-1000). Bivariate polynomial models enable simple rotation, translation, and scaling. Affine models may be appropriate for registration of image scenes acquired from different viewing perspectives, for example, if a perfect (e.g., pin-hole) camera is used, the camera is far from the scene imaged, and the surface imaged is flat. When the camera is close to the scene, then projective models are appropriate in order to handle scale changes from one edge of the scene to the other. For scenes with complex distortions (e.g., high terrain relief viewed from aerial sensors), second or third order polynomial models may be more appropriate (Zitova, B. and J. Flusser. 2003. Image registration methods: a survey. Image and Vision Computing, 21: 977-1000). Local transformation models may include piecewise linear and piecewise cubic mapping (Zitova, B. and J. Flusser. 2003. Image registration methods: a survey. Image and Vision Computing, 21: 977-1000). Local models may be appropriate when distortions vary over short distances. Local models may require a large number of accurate control points in order to generate local transformations.

Transformation of the subject image to match the positioning and inherit the grid of the reference image may require the subject image to be resampled. Resampling can be the digital process of estimating new image pixel values from the original image pixel values when the image grid position or size is changed (Parker, J. A., R. V. Kenyon, and D. E. Troxel. 1983. Comparison of interpolating methods for image resampling. IEEE Transactions on Medical Imaging, MI-2(1): 31-39). Depending upon the interpolation method used, original DN values or modified DN values may result. Resampling methods include: nearest neighbor, bilinear interpolation, bicubic functions, etc. (Zitova, B. and J. Flusser. 2003. Image registration methods: a survey. Image and Vision Computing, 21: 977-1000)

Image acquisition procedures that can enable precise spatial co-registration between multi-temporal aerial image frames are described in (i) Coulter et al., A Frame Center Matching Technique for Precise Registration of Multi-temporal Airborne Frame Imagery, IEEE Transactions on Geoscience and Remote Sensing, Vol. 41, No. 11, pp. 2436-2444, November 2003, and (ii) Stow et al., A frame center matching approach to registration for change detection with fine spatial resolution multi-temporal imagery, Int. J. Remote Sensing, Vol. 24, No. 19, pp. 3873-3879, May 2003. Traditional approaches generally do not attempt to match sensor station positions between collections and do not perform image co-registration between images from the same sensor stations first, before other processes such as geo-referencing or orthorectification.

Nadir viewing images can be acquired with the sensor pointing vertically (e.g., directly below the platform). Oblique images are characterized as images that are purposefully collected with off-nadir viewing angles (e.g., sensor is tilted up away from nadir). Obliques are characterized as high oblique (showing the horizon within the photo) and low oblique (not showing the horizon). Oblique images are utilized in Google Maps images (when zoomed in far enough in urban areas) and Bing Maps aerial images, as they enable viewing of the sides of buildings and provide a unique perspective. Oblique images also are useful for such things as earthquake damage assessment, since "pancaking" of multi-level buildings would be apparent in oblique images but might not be apparent in nadir-viewing images. As can be seen from Google Maps or Bing Maps, oblique viewing images provide information and detail that is not available from nadir viewing images (building height, building condition, building use, etc.).

Traditional airborne video systems typically collect airborne video at high imaging frame rates (e.g., 1-30 frames per second) continuously from a stationary or moving platform. Full motion video (FMV) systems are characterized as having limited image extent, and provide what is referred to as the "soda-straw" effect, where detailed video images are obtained using a very limited field of view of a very limited ground extent. New sensors such as Siena Nevada Corporation's Gorgon Stare and BAE System's ARGUS have been created in recent years to provide wide area motion imagery (WAMI). As with FMV, WAMI sensors collect video imagery at high frame rates (e.g., 1-30 frames per second) continuously from a stationary or moving platform. However, WAMI sensors combine several imaging sensors into a single large (e.g., 1.8 gigapixel in the case of ARGUS) video image. WAMI sensors may image large areas (e.g., 36 sq km) at high frame rates and with high spatial resolution (e.g., 3-inch), but these are expensive systems and may be limited in terms of the number available.

SUMMARY

Some embodiments disclosed herein relate to a method of imaging.

Some embodiments disclosed herein including a method for creating WAIV and/or WAIV mosaics across large areas are described. The approach may use repeat pass imagery collected from multiple sensor stations in the sky or in space. Global navigation satellite systems (e.g., Global Positioning System or "GPS") may be utilized to guide an aircraft or satellite platform along a specific flight path and the navigation system may also be used to trigger imaging sensors at predetermined sensor stations during each repeat pass. Using this methodology, the imaging sensor may be returned to the same physical locations (e.g., same X, Y, and Z coordinates representing location and altitude above ground), and the effect is that the imaging sensor is fixed mounted in that location taking video images with intermittent frequency. Multi-temporal imagery collected from the same sensor stations can be co-registered (aligned) automatically and utilized to mimic a video image sequence. Whereas traditional video typically collects one scene of interest with high temporal frequency (e.g., 30 times/second), imagery collected using some of the embodiments disclosed herein can be collected for multiple scenes of interest with reduced temporal frequency (e.g., over seconds, minutes, hours, days, weeks, months, and years) using a single platform/sensor or multiple platforms/sensors. In some embodiments, the sensor moves away from and later returns to sensor stations as part of the process of creating intermittent video, which can be a difference between WAIV and other airborne or satellite video imaging approaches. The WAIV approach has a range of applications with a range of imagery with different characteristics (e.g., spatial, spectral, radiometric, and temporal). For example, WAIV may be used with ultra-high spatial resolution imagery for military intelligence purposes, or with 10 m spatial resolution thermal imagery for tracking the movement of wildfire intermittently over time.

Some embodiments disclosed herein include a method for rapid and automated creation of wide area intermittent video over large areas using airborne or satellite image frames captured repeatedly from multiple sensor station positions. The method can include, in some embodiments, repeatedly flying one or more flightlines; capturing nadir or oblique viewing airborne or satellite image frames from multiple predetermined sensor stations along each flightline during each flight pass, wherein each of the image frames captured from the same sensor stations have approximately the same scene extents; identifying image frames captured over time from corresponding, matched sensor stations; and co-registering and aligning subject image frames captured from the same sensor station.

In some embodiments, the method includes georeferencing the co-registered image sets from multiple sensor stations to create wide area intermittent video sequences, wherein large areas corresponding to multiple image frames are displayed together.

In some embodiments, the method includes displaying together the co-registered images for each sensor stations, wherein the co-registered images are displayed based on the absolute or relative location of sensor stations.

In some embodiments, a frequency of capturing images at each sensor station is no more than once per second. In some embodiments, a frequency of capturing images at each sensor station is no more than once per 30 seconds. In some embodiments, a frequency of capturing images at each sensor station is no more than once per minute. In some embodiments, a frequency of capturing images at each sensor station is no more than once per 30 minutes. In some embodiments, a frequency of capturing images at each sensor station is no more than once per hour. In some embodiments, a frequency of capturing images at each sensor station is no more than once per 8 hours. In some embodiments, a frequency of capturing images at each sensor station is no more than once per day. In some embodiments, a frequency of capturing images at each sensor station is no more than once per week. In some embodiments, a frequency of capturing images at each sensor station is no more than once per month. In some embodiments, a frequency of capturing images at each sensor station is no more than once per year. In some embodiments, a frequency of capturing images at each sensor station is at least once per year. In some embodiments, a frequency of capturing images at each sensor station is at least once per month. In some embodiments, a frequency of capturing images at each sensor station is at least once per week. In some embodiments, a frequency of capturing images at each sensor station is at least once per day.

In some embodiments, the image frames are co-registered and aligned on a frame-by-frame basis.

In some embodiments, each of the image frames are co-registered and aligned relative to a reference image captured from the same sensor station. In some embodiments, the reference image is captured before flying the flightlines. In some embodiments, the reference image is selected from one of the images captured from the same sensor station while flying the flightlines. In some embodiments, the reference image is the image frame captured during a first pass of the flightline.

In some embodiments, the image frames are each aligned by matching three control points or more between the image frame and the reference image. In some embodiments, the image frames are each aligned by matching ten control points or more between the image frame and the reference image. In some embodiments, the image frames are each aligned by matching fifty control points or less between the image frame and the reference image. In some embodiments, the image frames are each aligned by matching twenty-five control points or less between the image frame and the reference image.

In some embodiments, the image frames are each co-registered to the reference image using a warping transformation, such as a projective or second-order transformation.

In some embodiments (particularly for satellite imagery), each image frame captured from the same sensor station is captured within several hundred meters of a pre-determined location of the sensor station. In some embodiments, each image frame captured from the same sensor station is captured within 50 meters of a pre-determined location of the sensor station. In some embodiments, each image frame captured from the same sensor station is captured within 30 meters of a pre-determined location of the sensor station. In some embodiments, each image frame captured from the same sensor station is captured within 20 meters of a pre-determined location of the sensor station. In some embodiments, each image frame captured from the same sensor station is captured within 10 meters of a pre-determined location of the sensor station.

In some embodiments, the pre-determined location of each sensor station in the flightlines have an altitude of at least 100 m. In some embodiments, the pre-determined location of each sensor station in the flightlines have an altitude of at least 500 m. In some embodiments, the pre-determined location of each sensor station in the flightlines have an altitude of at least 1 km. In some embodiments, the pre-determined location of each sensor station in the flightlines have an altitude of at least 2 km. In some embodiments, the pre-determined location of each sensor station in the flightlines have an altitude of at least 5 km. In some embodiments, the pre-determined location of each sensor station in the flightlines have an altitude of less than 100 km. In some embodiments, the pre-determined location of each sensor station in the flightlines have about the same altitude.

In some embodiments, the pre-determined location of each sensor station in the flightlines are spaced apart at least 50 m. In some embodiments, the pre-determined location of each sensor station in the flightlines are spaced apart at least 100 m. In some embodiments, the pre-determined location of each sensor station in the flightlines are spaced apart at least 200 m. In some embodiments, the pre-determined location of each sensor station in the flightlines are spaced apart at least 500 m. In some embodiments, the pre-determined location of each sensor station in the flightlines are spaced apart at least 1 km. In some embodiments, the pre-determined location of each sensor station in the flightlines are spaced apart at least 2 km. In some embodiments, the pre-determined location of each sensor station in the flightlines are spaced apart at least 10 km.

In some embodiments, the image frames captured have a spatial resolution of 10 meters or less (such as thermal imagery for tracking wildfire movement). In some embodiments, the image frames captured have resolution of 1 meter or less (such as for tracking land cover changes). In some embodiments, the image frames captured have resolution of 3 inches or less (such as for tracking people or vehicle movement). In some embodiments, the image frames captured have resolution of 1 inch or less (such as for locating newly placed improvised explosive devices in a war zone).

In some embodiments, each image frame captures a region of at least 50 m$^2$. In some embodiments, each image frame captures a region of at least 100 m². In some embodiments, each image frame captures a region of at least 500 m². In some embodiments, each image frame captures a region of at least 1 km². In some embodiments, each image frame captures a region of at least 2 km². In some embodiments, each image frame captures a region of at least 5 km². In some embodiments, each image frame captures a region of at least 10 km². In some embodiments, each image frame captures a region of no more than 50 km². In some embodiments, each image frame captures a region of no more than 20 km². In some embodiments, each image frame captures a region of no more than 10 km². In some embodiments, each image frame captures a region of no more than 5 km². In some embodiments, each image frame captures a region of no more than 2 km². In some embodiments, each image frame captures a region of no more than 1 km².

In some embodiments, each image frame is captured while the sensor is moving along the flightline. In some embodiments, each image frame is captured while the sensor is generally stationary. In some embodiments, each image frame is captured from an airplane or helicopter. In some embodiments, each image frame is captured from a satellite. In some embodiments, each image is captured from an aircraft that is automated to travel the flightlines. In some embodiments, the method can be performed by an automated system or device (i.e., without a human controlling any step while traveling the flightline).

Some embodiments disclosed herein include a method for creating wide area intermittent video. The method can include, for example, repeatedly flying a flightline that includes two or more sensor stations, wherein each of the sensor stations has a pre-determined physical location; capturing two or more sets of image frames while repeatedly flying the flightline, wherein each set of image frames contains image frames captured at each sensor station in the flightline during a single pass of the flightline; co-registering and aligning image frames from different sets of the images frames that are captured from the same sensor station; and successively displaying each set of image frames, wherein the images frames from each set of image frames are displayed together and arranged spatially based on an absolute or relative location of the sensor stations where each image frame is captured, and wherein the sets of image frames are displayed successively through time in an order in which the sets of image frames are captured.

In some embodiments, repeating flying the flight line includes flying the flightline at a pre-determined frequency of every 30 seconds or longer. In some embodiments, repeating flying the flight line includes flying the flightline at a pre-determined frequency of every 1 minute or longer. In some embodiments, repeating flying the flight line includes flying the flightline at a pre-determined frequency of every 10 minutes or longer. In some embodiments, repeating flying the flight line includes flying the flightline at a pre-determined frequency of every 1 hour or longer. In some embodiments, repeating flying the flight line includes flying the flightline at a pre-determined frequency of every 1 day or longer. In some embodiments, repeating flying the flight line includes flying the flightline at a pre-determined frequency of every 1 week or longer. In some embodiments, repeating flying the flight line includes flying the flightline at a pre-determined frequency of every 1 year or longer. In some embodiments, repeating flying the flight line includes flying the flightline at a pre-determined frequency of every 1 year or less. In some embodiments, repeating flying the flight line includes flying the flightline at a pre-determined frequency of every 1 month or less. In some embodiments, repeating flying the flight line includes flying the flightline at a pre-determined frequency of every 1 week or less. In some embodiments, repeating flying the flight line includes flying the flightline at a pre-determined frequency of every 1 day or less.

In some embodiments, each image frame captured at the same sensor station has substantially the same natural or artificial lighting conditions. In some embodiments, each image frame captured at the same sensor station is captured at approximately the same time of day.

In some embodiments, each image frame captured in the sets of image frames are captured using the same sensor. In some embodiments, the sensor is a camera.

In some embodiments, co-registering and aligning the image frames includes separately co-registering and aligning each of the image frames captured from the same sensor station with a reference image frame captured at the same sensor station. In some embodiments, the reference image frame is selected from one of the images frames in the sets of image frames.

In some embodiments successively displaying each set of image frames includes displaying each set of image frames such that the image frames overlap to display a spatially continuous, aggregate image formed by the set of image frames.

In some embodiments, the image frames have a resolution of about 3 inches or less. In some embodiments, the image frames have a resolution of about 1 foot or less. In some embodiments, the image frames have a resolution of about 1 meter or less. In some embodiments, the image frames have a resolution of about 10 meters or less.

In some embodiments, the images are each co-registered using a warping transformation, such as a projective or second-order polynomial transformation.

In some embodiments, the airborne image frames captured at the same sensor station are captured within 50 m or less of the predetermined location the same sensor station.

In some embodiments, the satellite image frames captured from the same sensor station is captured so that the angular deviation between two lines connecting each actual sensor position and any individual location within the common area of the two scenes is less than five degrees.

Some embodiments disclosed herein include a system for detecting a change in a region. The system can include, for example, one or more processors; a sensor in communication with at least one of the processors and configured via at least one of the processors to capture a subject image of a region and send the subject image to at least one of the processors; and a navigation system in communication with at least one of the processors and configured to provide at least one of the processors an approximate location of the sensor, wherein at least one of the processors is configured to send a signal to the sensor to capture the subject image of the region each time the sensor reaches one of a plurality of pre-determined locations, wherein at least one of the processors is configured to perform the following: receive two or more subject images captured at each of the plurality of pre-determined locations; and co-register and align each of the subject images captured from the same pre-determined location, and wherein at least one of the processors is configured to form a wide area intermittent video by combining captured images based on a relative location and time that the captured images are captured by the sensor at the plurality of pre-determined locations.

In some embodiments, the system includes a stabilized gyroscopic mount configured to stabilize the sensor (e.g., camera).

The systems disclosed herein may, in some embodiments, be configured to perform any of the methods disclosed in the present application.

BRIEF DESCRIPTION OF THE DRAWINGS

Embodiments of present application will become more fully understood from the detailed description and the accompanying drawings, which are not intended to limit the scope of the present application.

DETAILED DESCRIPTION

Figure 1:
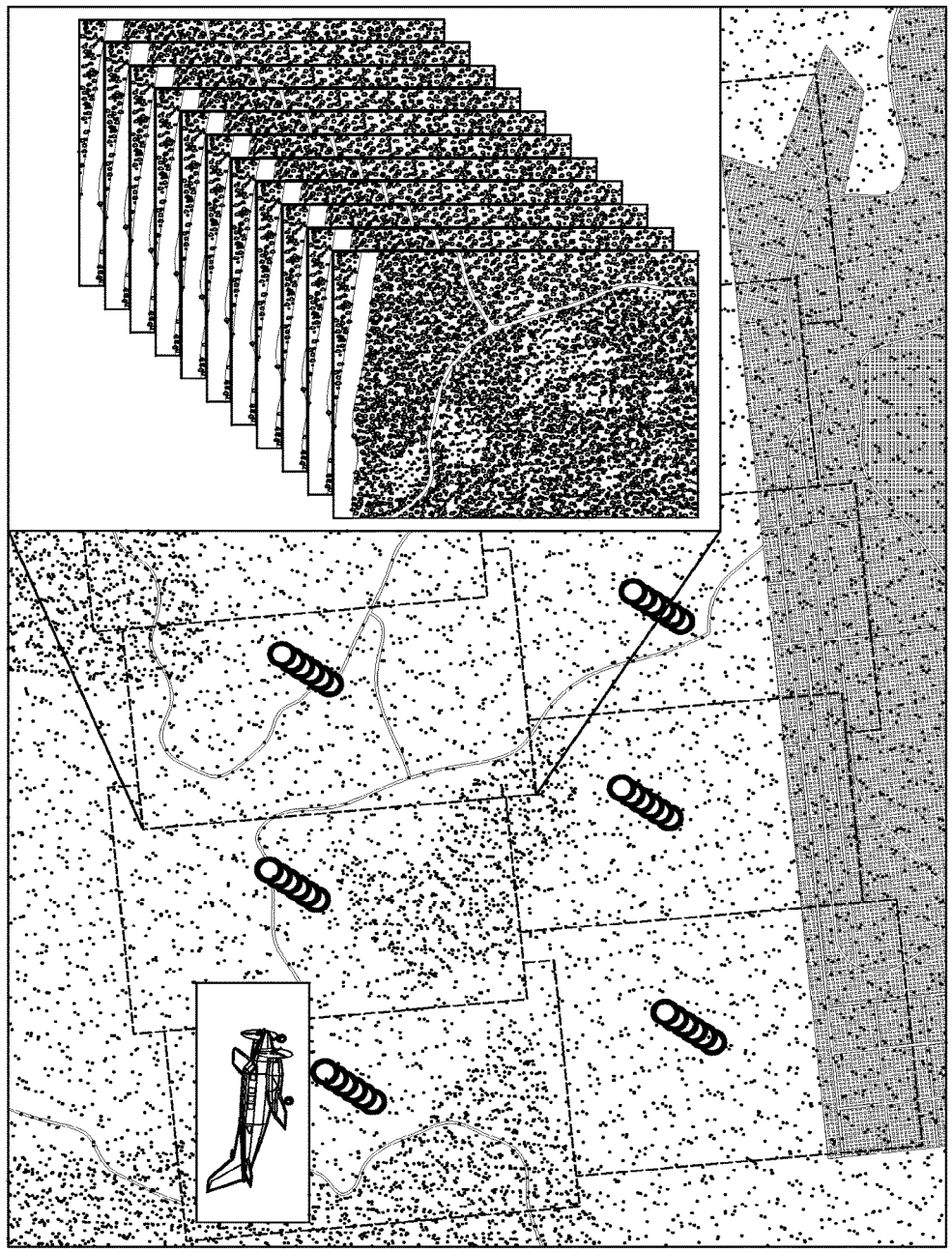
FIG. 1 illustrates one example of the concept of image collection for wide area intermittent video, where multiple image frames are collected through time from each of the same predetermined sensor stations using repeat pass imaging.

After reading this description it will become apparent to one skilled in the art how to implement the various embodiments and alternative applications described herein. It is understood that the embodiments presented here are presented by way of an example only, and not limitation. As such, this detailed description of various alternative embodiments should not be construed to limit the scope or breadth of the present application as set forth below.

Some embodiments disclosed herein include a method for creating wide area intermittent video (WAIV) and/or WAIV mosaics across large areas. The method can include, for example, repeat pass imagery collected repeatedly from multiple sensor stations in the sky or in space. The approach builds off of previous work by the applicant where global navigation satellite systems (e.g., GPS) are utilized to guide individual or multiple platforms (e.g., aircraft or satellite) along a specific flight path and the navigation system is also used to trigger imaging sensors (e.g., cameras) at predetermined sensor stations during each repeat pass. Using this methodology, the airborne or satellite mounted imaging sensor is returned to substantially the same physical locations (e.g., same X, Y, and Z coordinates representing location and altitude above ground), and the effect is that the imaging sensor operates as if it were fixed mounted at that location. Multiple images collected from each individual sensor station over time can then be co-registered (aligned) automatically and utilized to produce a video image sequence. Whereas traditional video collects one scene of interest with high temporal frequency (e.g., 30 frames/second), imagery collected using the approach described above can be collected from a single platform (using, a single sensor, such as a camera) for multiple scenes of interest at lower frame rates (e.g., over seconds, minutes, hours, days, weeks, months, or years) depending on the imaging repetition capabilities or specifications of airborne or satellite platforms utilized. The fact that a sensor moves away from and later returns to sensor stations as part of the process of creating intermittent video may be an important difference between WAIV and other airborne or satellite video imaging approaches. Further, multiple sensors onboard multiple platforms may be utilized to increase the number of flight paths for which imagery is collected (enabling wider area coverage), or the frequency with which imagery is collected along a single flight path (e.g., increasing the temporal resolution or imaging frame rate for a sequence of sensor stations). In addition, the imaging sensor may have any viewing perspective (e.g., nadir-viewing, oblique, towards space, etc.).

WAIV imagery can include one or more differences relative to traditional airborne video systems. The wide area intermittent video technique may be utilized to create moderate (e.g., 10 m) to ultra-high resolution video (e.g., 3 inches or less) over wide areas at reduced temporal frame rates, using less complex and relatively low-cost sensors (e.g., commercial-off-the-shelf cameras). Further, any imaging frame rate may be selected and used (e.g., seconds, minutes, hours, days, weeks, months, and years).

The methods disclosed herein may, in some embodiments, be performed using various systems or components. For example, the imagery can be captured from an aircraft (e.g., a plane, helicopter, satellite, or other machine capable of flight), which can be manned or unmanned. A digital camera system (e.g., commercial-off-the-shelf digital SLR camera) can be used to capture the imagery. In some embodiments, stabilized gyroscopic mount can be used to stabilize a sensor (e.g., a camera) during image capture. A global positioning system (GPS) or other global navigation satellite system (GNSS) may be used for aircraft navigation, tracking the location of the sensor, and/or triggering image capture at appropriate locations. The methods may, in some embodiments, utilize an internal measurement unit (IMU) for tracking the altitude of the aircraft while capturing images. One or more processors may be utilized to perform the method disclosed herein. For example, the process can be in communication with a camera and a GPS, and configured to (i) receive positioning information from the GPS and (ii) capture an image using the camera whenever a pre-determined location is reached (or within a certain threshold distance). The processor may also be in communication with the IMU and may only capture images with the camera when it is at a pre-determined altitude (or within a pre-determined range). In some embodiments, one of the processor may be configured to fly the aircraft along a pre-determined flight line while capturing one or more images. In some embodiments, one of the processors can be configured to complete real-time processing of images captured. For example, the process may co-register a captured image with a previously-captured image captured at the same location. The processor may also be configured to complete direct georeferencing (e.g., assigning real-world coordinates to all or a portion of the pixels) of a series of images acquired from matched sensor stations and co-registered to each other prior to direct georeferencing. The processors can include machine-readable memory (e.g., flash memory, etc.) that includes software for performing any of the operations disclosed in the present application (e.g., capturing images, processing images, etc.). The machine-readable memory may, in some embodiments, include a list of two or more locations (e.g., 2, 3, 5, 10, 50, 100 or more locations) for capturing images. In some embodiments, a wireless communication system can be used to send images (before or after processing) from the aircraft to a ground facility.

Image Collection and General Procedures

Image acquisition procedures that enable precise spatial co-registration between multi-temporal image frames are described in Coulter et al., A Frame Center Matching Technique for Precise Registration of Multi-temporal Airborne Frame Imagery, IEEE Transactions on Geoscience and Remote Sensing, Vol. 41, No. 11, pp. 2436-2444, November 2003, and Stow et al., A frame center matching approach to registration for change detection with fine spatial resolution multi-temporal imagery, Int. J. Remote Sensing, Vol. 24, No. 19, pp. 3873-3879, May 2003, the contents of which are both incorporated herein by reference in their entirety. As used herein, spatial co-registration is the alignment of two separate images to match each other. The approach that has previously been referred to as frame center (FC) matching (and is now referred to as repeat station imaging, or RSI when implemented with digital frame cameras (with 2-dimensional arrays), is based upon matching sensor stations in terms of horizontal and vertical (e.g., altitude) position between multi-temporal image acquisitions. Matching sensor stations for airborne and satellite imaging can be accomplished through the use of GPS technology (or similar GNSS) to aid a piloted or unpiloted aircraft in maintaining the desired track and altitude, and automatically trigger image capture at the same sensor station previously visited during the first imaging pass.

Five specific tools may be used for operational sensor station matching of airborne or satellite images using GPS data: 1. Creating predetermined sensor station positions from which multi-temporal repeat station imagery will be collected; 2. GPS for logging and digitally archiving flight line and frame center coordinates for each image acquisition. 3. Flight planning software integrated with digital coordinates of flight line and frame coordinates from previous image dates. 4. In-flight, heads-up display enabling pilot to maintain flight line course and altitude (based on GPS coordinates)-only for piloted airborne imaging systems. 5. Automatic triggering of image frames or line arrays (based on digitally archived coordinates and in-flight GPS). In addition, gyrostabilized mounts with inertial measurement units (IMU) or other similar devices may optionally be used to ensure that images captured from the same sensor stations also have nearly identical scene extents on the ground.

When multi-temporal images of a scene are captured from about the same sensor station between multi-temporal acquisitions, there will be little or no parallax between the images, and they may exhibit the same or similar terrain (or 3-dimensional structure) related geometric distortions such as relief displacement. Essentially, the images can be carbon copies of each other except, except there are systematic distortion differences associated with camera altitude (but these can be corrected using such things as second order polynomial warping). Further, the relative spatial position of features within the images can be consistent between image sets (e.g., no local distortion differences) and the individual image frames may be precisely co-registered using simple geometric warping functions (e.g., projective or second order polynomial).

A second component of the approach is that FC matched images are spatially co-registered on a frame-by-frame or line-by-line basis (in the case of a linear imaging array) so that the benefits of similar viewing geometry are maintained during image registration and subsequent processing. The present process matches the viewpoint for each image frame (e.g., 2-dimensional picture) or line (e.g., 1-dimensional picture). Doing this replicates the view geometry of the first image, and spatial co-registering images is significantly simplified since there are little or no distortion differences between images. Rather than referencing images to a common coordinate system (e.g., georeferencing/orthorectifying and assigning real world coordinates to each image pixel) and mosaicking image sets individually for each multi-temporal acquisition and thereby aligning the two image mosaics, the sensor station matching approach first spatially co-registers and aligns station matched image frames (or lines in the case of a linear imaging arrays), then each aligned image set is subjected to the same subsequent processing for georeferencing and mosaicking (if these subsequent steps are required). Image-to-image alignment (on a frame-by-frame or line-by-line basis) may also occur as part of a process for georeferencing, if for example a new subject image frame is aligned to a previously georeferenced/orthorectified image frame. Using this approach, the sensor stations are matched during image acquisition and images are processed on a frame-by-frame or line-by-line basis as part of the georeferencing/orthorectification process.

The applicants have published several papers describing, utilizing, and evaluating the approach for alignment of bi-temporal imagery (imagery from two dates) for change detection purposes. These include: Coulter, L., D. Stow, and S. Baer. 2003. A frame center matching approach to registration of high resolution airborne frame imagery. *IEEE Transactions on Geoscience and Remote Sensing*, 41(11): 2436-2444; Coulter, L. and D. Stow. 2005. Detailed change detection using high spatial resolution frame center matched aerial photography. In: *Proceedings of the 20th Biennial Workshop on Aerial Photography, Videography, and High Resolution Digital Imagery for Resource Assessment*, Oct. 4-6, 2005, Weslaco, Tex.; Coulter, L. and D. Stow. 2008. Assessment of the spatial co-registration of multi-temporal imagery from large format digital cameras in the context of detailed change detection. *Sensors*, 8: 2161-2173; Coulter, L. and D. Stow. 2009. Monitoring habitat preserves in southern California using high spatial resolution multispectral imagery. *Environmental Monitoring and Assessment*, 152: 343-356; Coulter, L., C. Lippitt, D. Stow, and R. McCreight. 2011a. Near real-time change detection for border monitoring. *Proceedings from the ASPRS annual conference*, Milwaukee, Wis., May 1-5, 2011; Coulter, L., D. Stow, Y. H. Tsai, and M. L. Caldwell. 2011b. Automated detection of people and vehicles in the border region using airborne remote sensing. White Paper delivered to the University of Arizona, Tucson for Department of Homeland Security, Science and Technology funded National Center for Border Security and Immigration project, Aug. 11, 2011; Coulter, L., D. Stow, S. Kumar, S. Dua, B. Loveless, and V. Shrivastay. 2011c. Automated coregistration of multi-temporal airborne frame images for border monitoring. White Paper delivered to the University of Arizona, Tucson for Department of Homeland Security, Science and Technology funded National Center for Border Security and Immigration project, Aug. 11, 2011; Coulter, L. D. Stow, S. Kumar, S. Dua, B. Loveless, G. Fraley, C. Lippitt, and V. Shrivastava. 2012a. Automated co-registration of multi-temporal airborne frame images for near real-time change detection. *Proceedings of the ASPRS 2012 annual conference*, Sacramento, Calif., Mar. 19-23, 2012; Coulter, L., D. Stow, Y. H. Tsai, C. Chavis, C. Lippitt, G. Fraley, and R. McCreight. 2012b. Automated detection of people and vehicles in natural environments using high temporal resolution airborne remote sensing. *Proceedings of the ASPRS 2012 annual conference*, Sacramento, Calif., Mar. 19-23, 2012; Stow, D., L. Coulter, and S. Baer. 2003. A frame centre matching approach to registration for change detection with fine spatial resolution multi-temporal imagery. *International Journal of Remote Sensing*, 24: 3873-3879; Stow, D., Y. Hamada, L. Coulter, and Z. Anguelova. 2008. Monitoring shrubland habitat changes through object-based change identification with airborne multispectral imagery. *Remote Sensing of Environment*, 112: 1051-1061; and Coulter, L., D. Stow, Y. H. Tsai, C. Chavis, R. McCreight, C. Lippitt, and G. Fraley. 2012. A New Paradigm for Persistent Wide Area Surveillance. Proceedings of the IEEE International Conference for Homeland Security Technologies, Waltham, Mass., November 13-15.

Aligning the images using traditional methods (e.g., georeferencing/orthorectifying in the case of satellite or aerial images) generally requires that the images be very accurately positioned with all spatial distortions (associated with 3-dimensional terrain, vegetation, or buildings-related) removed, which is a complicated process requiring time and intensive processing, terrain/vegetation/building structure models, and surveyed ground control (in the case of aerial/satellite images). Further, without highly accurate and detailed ground control and 3-dimensional feature models, accurate co-registration with ultra-high (e.g., 3-inch) spatial resolution imagery may not be possible or practical using traditional techniques. Using the station matching approach, the images are aligned (co-registered) first, and then once aligned further processing (e.g., geo-referencing) may be applied if desired. For a large number of applications, only crude absolute positioning of co-registered image products is required, which means that after images are spatially co-registered, only a certain level of positional accuracy needs to be achieved. In some cases, information about position and attitude calculated by sensors on-board an aircraft (e.g., using GPS and inertial measurement units) is sufficient to position the imagery with acceptable accuracy, which enables automated georeferencing (direct georeferencing). However, using the WAIV approach, precise (e.g., pixel level) alignment between time sequential images can be achieved.

FIG. 1 illustrates an example of the concept of image collection for wide area intermittent video. Image footprints associated with multiple sensor stations are shown. For each image footprint, there are multiple small circles near the center of the image footprint. These small circles indicate a single sensor station position that is revisited through time by an imaging sensor (the circles are offset so that they can each be seen, and do not represent any spatial offset between sensor station positions through time). A series of individual image frames associated with a single sensor station position and associated footprint is shown toward the right in FIG. 1. It can be inferred from the figure that each sensor station position and associated footprint has a similar sequence of image frames through time that may be precisely co-registered to create wide area intermittent video. In addition, images from multiple sensor station positions may be combined to create mosaics of WAIV across large areas.

Identification of Images Captured from Matched Sensor Stations

Following multi-temporal image collection, image sets captured from matched sensor stations are identified so that they may be spatially co-registered on a frame-by-frame basis prior to any other processing or analysis. For aerial and satellite images, this may be accomplished in an automated fashion using either: 1) unique identification numbers for each individual sensor station and/or 2) GPS/GNSS data collected for each image frame in order to determine which image frames were captured from matched sensor stations (within a specified tolerance). The general accuracy of non-differentially corrected airborne GPS positions is +/−10 m. Therefore, matched sensor stations between multi-temporal imaging passes may be expected to be within +/−20 m (plus a few extra meters for timing errors associated with GPS-based sensor triggering). However, matched positions could vary by as much as 50 meters depending upon the collection precision. Positions of individual sensor stations can be, for example, hundreds of meters apart or more, so determining which images belong to which sensor station may be trivial. Further, services like the Wide Area Augmentation System (WAAS) may also be used to differentially correct the GPS data and further reduce errors.

Matching image view geometry can be used in WAIV image collection, as matched view geometry between multi-temporal images enables precise frame-to-frame co-registration using a limited number of matched points (e.g., 15-30) and simple warping transformations (e.g. second-order polynomial warping). Matched view geometry can be associated with matching view angles, and the absolute accuracy of position matching is less important as an aircraft or satellite moves higher in altitude. For example, a spatial offset in sensor station matching of 100 meters from a satellite platform that is hundreds of kilometers in space has negligible effects on view geometry. Therefore, one aspect of the repeat station imaging approach is the view geometry. Successful image alignment may be achieved if view angle differences between imaging stations is less than ten degrees (or preferably less than five degrees). Therefore, satellite image frames are considered to be captured from the same sensor when the angular deviation between two lines connecting each actual sensor position and any individual location within the common scene is less than ten degrees (or preferably less than 5 degree). The WAIV approach may exhibit improved results when matching sensor stations as closely as possible during repeat pass imaging, and likewise by reducing view angle differences resulting from errors in matching sensor stations.

Image Co-Registration

Once station matched images are automatically identified, these images are co-registered using automated image spatial co-registration techniques. Image registration involves geometrically or spatially aligning two or more images so that they may be compared or utilized together. Image registration has a wide range of application fields. In the context of remote sensing, image registration is often used to prepare airborne or satellite imagery for change detection, image classification, and image fusion.

Image registration in general is utilized to transform a subject image so that it is geometrically aligned with a reference image and may generally include three steps: 1) feature matching, 2) geometric transform (e.g., warping) model estimation, and 3) image resampling and transformation. Feature matching may identify corresponding image coordinate sets between the images that may be utilized to estimate the transformation model. Feature matching may be accomplished using feature-based, area-based or human-delineated approaches. In some embodiments, transform model estimation is the process of estimating and possibly fine tuning the transformation model in order to achieve accurate image registration. The derived transformation model is the best estimate given available information, and each observed control point is likely to have some level of residual error compared to the model. When determining residual error, it may be difficult to separate the locational error of the observed control point versus the error in the transformation model that may incompletely represent the distortion surface. Once a final transformation model is attained, the subject image may be transformed and resampled (converting subject image pixel values from the subject image grid to the reference image grid).

This non-traditional WAIV approach can exploit basic geometric principles to enable rapid and precise alignment of images using simple techniques. Traditional approaches do not attempt to match sensor stations between collections and do not perform image co-registration between images from the same sensor stations first, before other processes such as georeferencing. In some embodiments, only matching points have to be identified and existing, basic warping functions applied. Existing techniques require human involvement, surveyed ground control, terrain, or other three-dimensional (e.g., horizontal and vertical) control data. Currently, aerial and satellite image sets are orthorectified first to remove terrain/building/vegetation distortions and attempt to provide accurate positioning information. Orthorectification is the process of removing all image distortions resulting from view angle, terrain, building height, etc. so that the resulting orthorectified images contain map-like properties (every pixel is located at its correct position on the earth). As is understood, orthorectification results are only as good as the control data utilized in the process. For example, if survey control data from monuments as well as terrain, vegetation and building information (e.g., building 3-D models) are highly accurate, then image orthorectification results may be highly accurate. The problem is that terrain data are often not very accurate (or costs a lot of money to make it accurate) and fully realistic and accurate tree/building models do not exist. Therefore, image orthorectification results often have substantial errors, especially with ultra-high spatial resolution imagery.

Once two or more image sets are precisely co-registered, they may then be compared at or near the pixel level. Generating accurately positioned image sets requires surveyed ground control, specialize information about terrain or other 3-dimensional features, and extensive analyst time. For high spatial resolution imagery, achieving precise spatial co-registration is difficult in most cases and impossible in some cases, due to inherent image distortions that are not removed through image orthorectification processing. Image orthorectification often cannot completely remove distortions. Some embodiments described herein don't remove distortions, but rather match distortions exactly between image sets so the multi-temporal images are a geometric carbon copy of the reference image and align precisely. This WAIV approach has not been utilized with oblique viewing imagery. Further, sensor station matching has not been utilized by the remote sensing industry for image registration (neither nadir nor oblique).

In some embodiments, software is created to facilitate the sensor station matching approach. The software may automatically identify images that were acquired from the matched photo (frame center) positions, may automatically co-register the images, and may then geo-reference the images so that they may be located on the Earth's surface and used with other map layers. Change detection capabilities may be implemented in the software.

For oblique images, the aircraft horizontal rotation (yaw or crab) may be controlled so that oblique images are viewing the same scene between multi-temporal acquisitions. In addition, image distortions resulting from slightly different (mismatched) viewing positions may yield higher magnitude and more variable distortions between multi-temporal images, as oblique images have objects (buildings, etc.) at a range of distances from the viewing point. For line-array systems, stabilization and sensor attitude (view angle) control systems may be used so that sensor stations and resulting imaged ground locations correspond per sensor station (however this is complicated using line array sensors).

Figure 2:
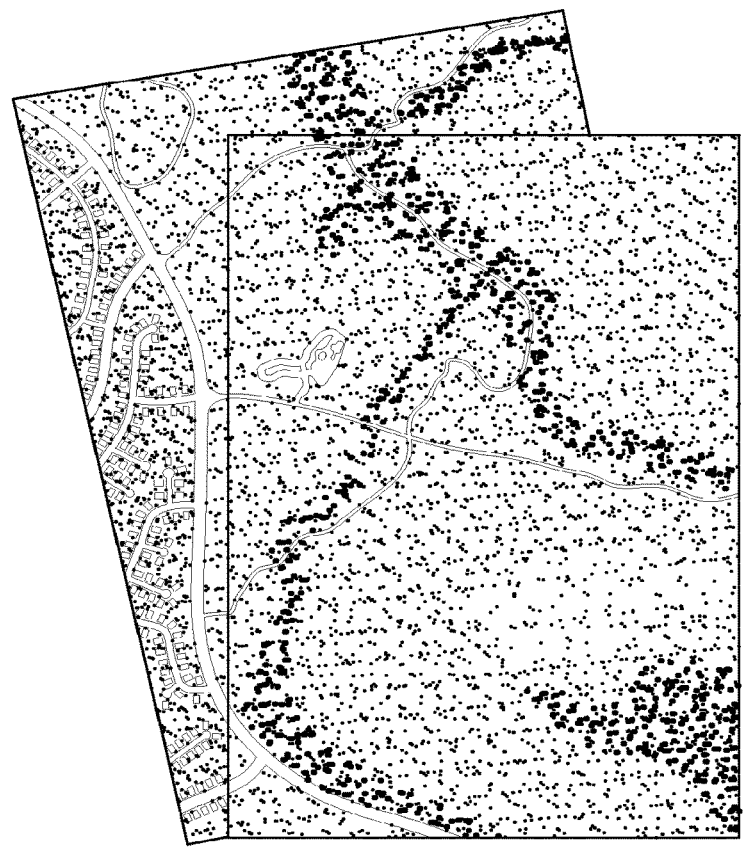
FIG. 2 illustrates an example of frame-by-frame image co-registration, using previously unprocessed image frames collected from matched sensor stations and viewing the same scene from the same position (though with slightly different camera/sensor attitude).
Figure 2:
Figure 2:

FIG. 2 illustrates an example of frame-by-frame image co-registration, using previously unprocessed, rectangular image frames collected from matched sensor stations and viewing the same scene from the same position (though with slightly different camera/sensor attitude). The two image frames as collected by a camera with no additional processing are displayed. In addition, the co-registered images are displayed together. These images were captured from the same horizontal and vertical position in the sky, and largely viewing the same scene. The images were captured seven years apart. Some differences in camera rotation and view angle may be seen (differences in camera attitude). The area in the scene is characterized as mountainous, with extreme relief changes. The elevation change from the river valley in the middle to the hilltop on the left side of the image is approximately 800 ft. Extreme terrain relief normally yields extreme spatial distortion differences between airborne and satellite images over time. However, these images were captured from the same position in the sky with comparable view geometry from sensor to individual pixels, and the images align precisely. Seven matching points were used with a second order polynomial transformation to align these images. Components of FIG. 2 include: (a) time-1 reference image frame, (b) time-2 subject image frame, and (c) time-2 registered to time-1 multi-temporal image set.

Figure 3:
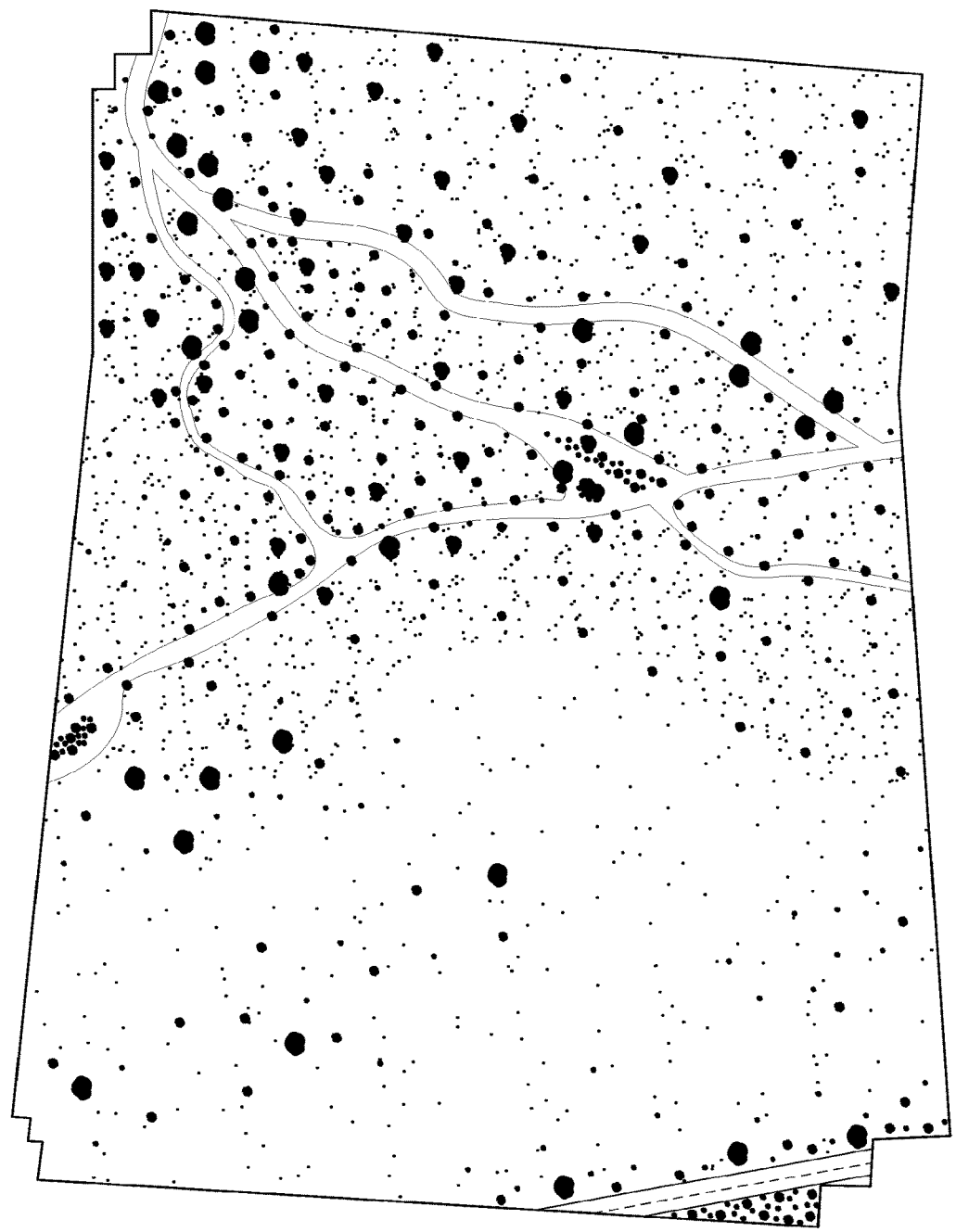
FIG. 3 illustrates an example of nine co-registered images for a desert site that were collected from the same sensor station using repeat pass imaging with a return frequency of approximately one pass every four minutes (individual image frames were captured every four minutes over a period of 40 minutes).

FIG. 3 illustrates nine sensor station matched images from a desert site that have been co-registered and overlaid. The nine images were captured with a frequency of one frame every four minutes on Sep. 29, 2011 over the period 9:00-9:40 AM in eastern San Diego County. When sequenced through time, these images yield intermittent video. Individual image corners from many of the nine image frames can be seen towards the corners of FIG. 3. These images were captured from matched sensor stations and co-registered on a frame-by-frame basis (achieving near pixel-level spatial co-registration). The spatial resolution is 3-inch (0.08 m). These images were captured using a 21 megapixel Canon 5D Mark II commercial-off-the-shelf digital camera mounted on a light aircraft flying approximately 2000 feet above ground level. The distance from left to right across the scene is approximately one quarter mile.

Figure 4:
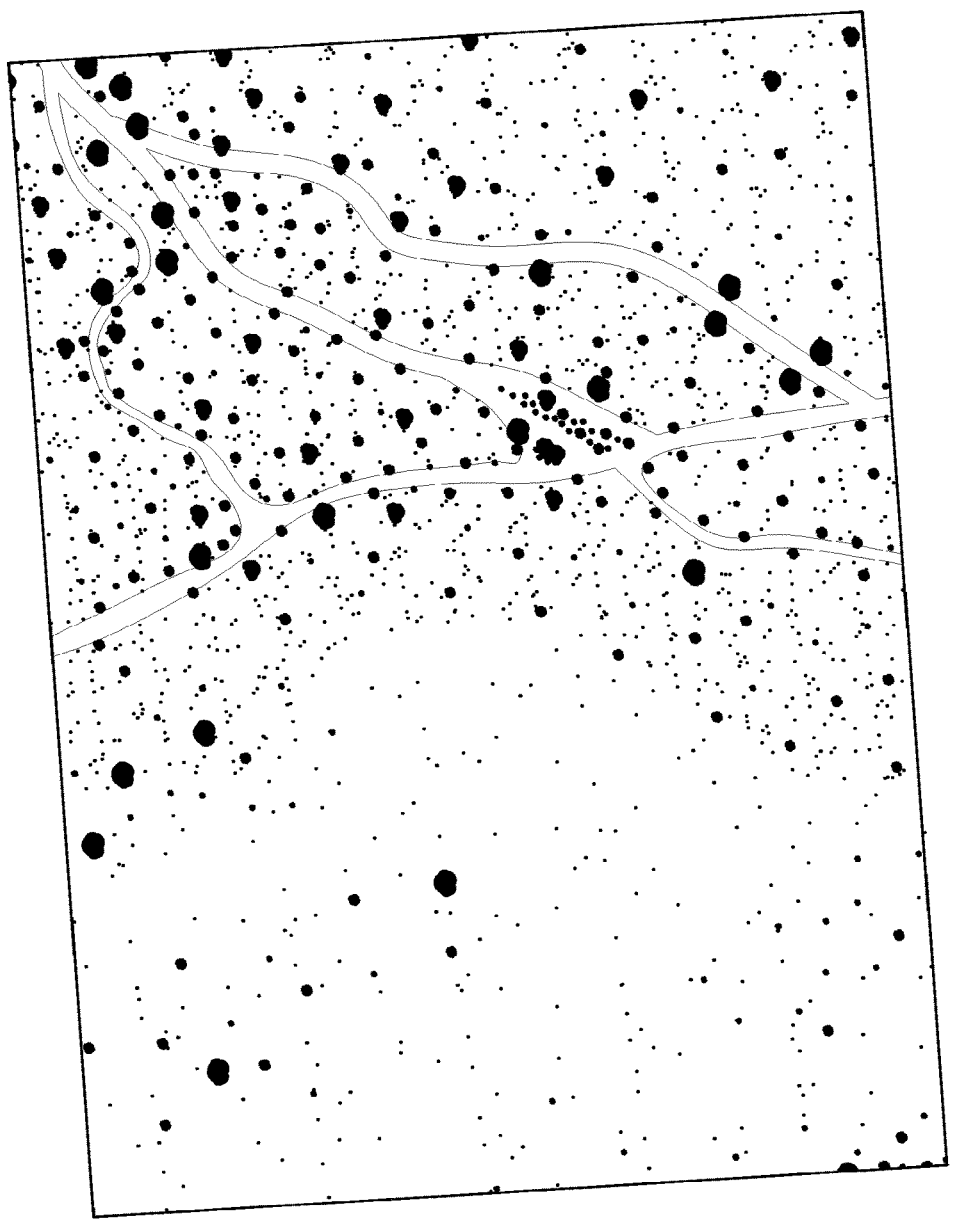
FIG. 4 illustrates an example of a single image frame that is part of the sequence of nine co-registered images shown in FIG. 3.

FIG. 4 illustrates an example of a single image frame that is part of the sequence of nine co-registered images shown in FIG. 3. This image was captured using a 21 megapixel Canon 5D Mark II commercial-off-the-shelf digital camera mounted on a light aircraft flying approximately 2000 feet above ground level. The distance from left to right across the scene is approximately one quarter mile.

Figure 5:
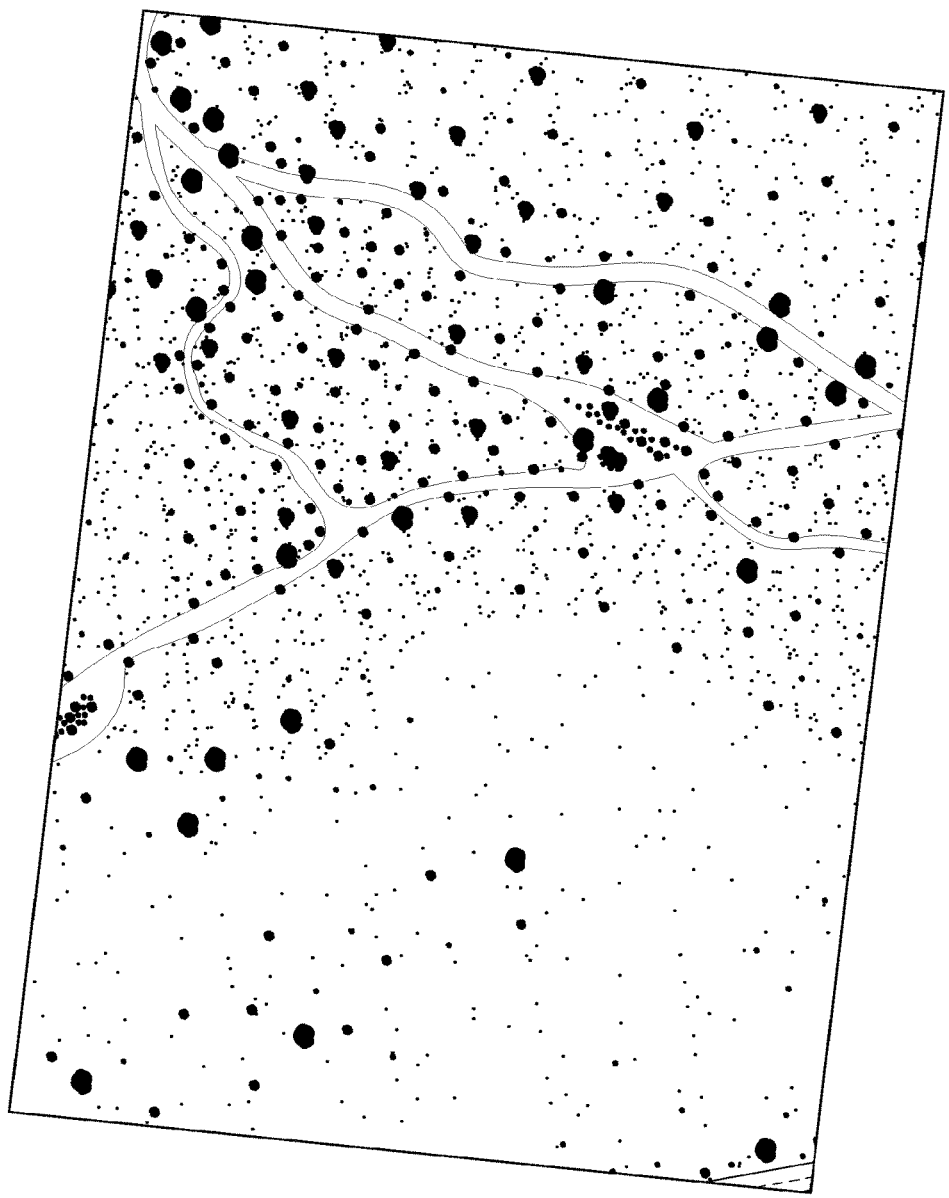
FIG. 5 illustrates another example of a single image frame that is part of the sequence of nine co-registered images shown in FIG. 3.

FIG. 5 illustrates another example of a single image frame that is part of the sequence of nine co-registered images shown in FIG. 3. This image was captured using a 21 megapixel Canon 5D Mark II commercial-off-the-shelf digital camera mounted on a light aircraft flying approximately 2000 feet above ground level. The distance from left to right across the scene is approximately one quarter mile.

Figure 6:
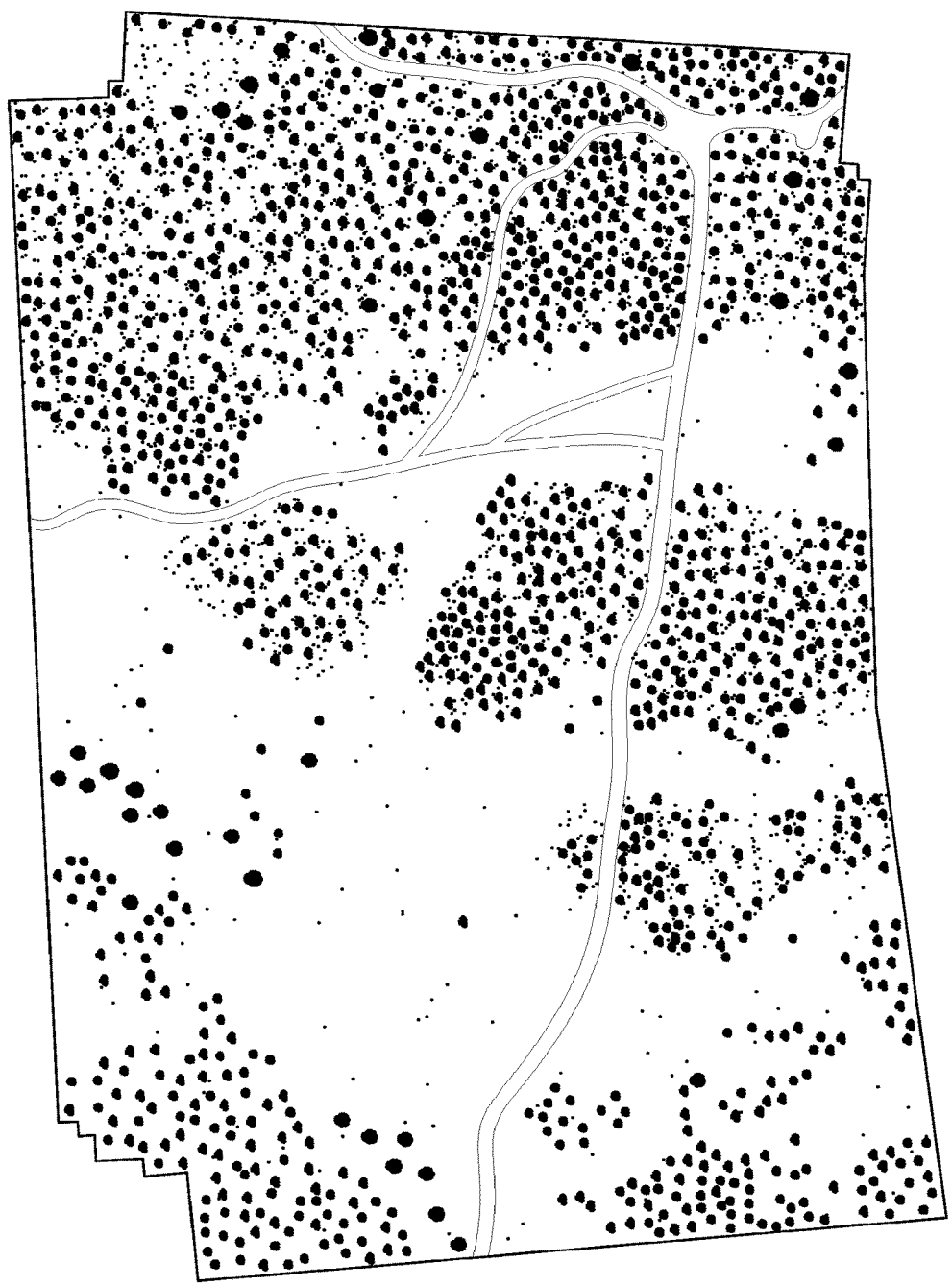
FIG. 6 illustrates an example of thirteen co-registered images for a grassland site that were collected from the same sensor station using repeat pass imaging with a return frequency of approximately one pass every four minutes (individual image frames were captured every four minutes over a period of 55 minutes).

FIG. 6 illustrates thirteen sensor station matched images from a grassland site that have been co-registered and overlaid. The thirteen images were captured with a frequency of one frame every four minutes on Sep. 29, 2011 over the period 10:15-11:10 AM in eastern San Diego County. When sequenced through time, these images yield intermittent video. Individual image corners from many of the thirteen image frames can be seen towards the corners of FIG. 6. These images were captured from matched sensor stations and co-registered on a frame-by-frame basis (achieving near pixel-level spatial co-registration). The spatial resolution is 3-inch (0.08 m). These images were captured using a 21 megapixel Canon 5D Mark II commercial-off-the-shelf digital camera mounted on a light aircraft flying approximately 2000 feet above ground level. The distance from left to right across the scene is approximately one quarter mile.

Figure 7:
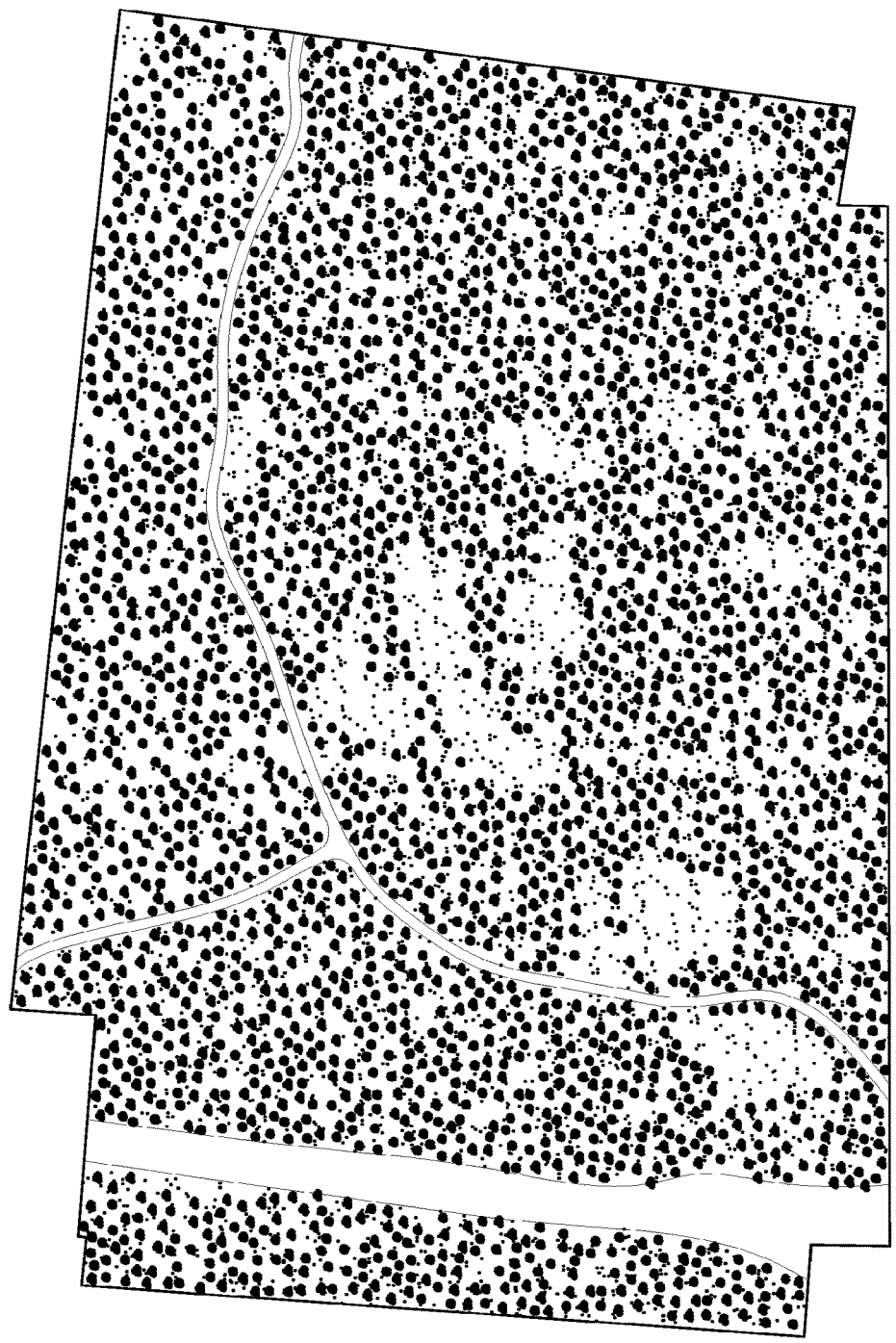
FIG. 7 illustrates an example of thirteen co-registered images for a chaparral site that were collected from the same sensor station using repeat pass imaging with a return frequency of approximately one pass every four minutes (individual image frames were captured every four minutes over a period of 55 minutes).

FIG. 7 illustrates thirteen sensor station matched images from a chaparral site that have been co-registered and overlaid. The thirteen images were captured with a frequency of one frame every four minutes on Sep. 29, 2011 over the period 10:15-11:10 AM in eastern San Diego County. When sequenced through time, these images yield intermittent video. Individual image corners from many of the thirteen image frames can be seen towards the corners of FIG. 7. These images were captured from matched sensor stations and co-registered on a frame-by-frame basis (achieving near pixel-level spatial co-registration). The spatial resolution is 3-inch (0.08 m). These images were captured using a 21 megapixel Canon 5D Mark II commercial-off-the-shelf digital camera mounted on a light aircraft flying approximately 2000 feet above ground level. The distance from left to right across the scene is approximately one quarter mile.

Methods and systems for co-registering and aligning images captured from approximately the same location are also disclosed in U.S. application Ser. No. 13/676,854, filed Nov. 14, 2012, which is hereby incorporated by reference in its entirety. These methods and systems can be incorporated into the method and systems disclosed in the present application.

Combining Multiple Wide Area Intermittent Video Across Large Areas

When a temporal sequence of images is captured from the same sensor station and precisely aligned using one image as the master (or reference) against which all others are co-registered, the images may be viewed and/or analyzed in their correct temporal progression to create a wide area intermittent video sequence. Further, a moving aircraft or satellite may collect images at several (e.g., tens or hundreds) or sensor stations as part of a regular flight path or orbit, thereby creating several (e.g., tens or hundreds) of wide area intermittent video sequences over large areas. Automated image registration may be used to fully automate the creation of the large number of video sequences, so that they may be viewed or analyzed rapidly.

Following co-registration and creation of the individual wide area intermittent video image sequences, each sequence may be georeferenced so that image coordinates represent specific, real-world locations on the earth, and geographic information systems (GIS) layers may be overlaid and utilized with the video sequences. Further, once the individual video sequences are georeferenced, they may also be combined and/or displayed together to create mosaics of video sequences, where large areas corresponding to multiple image footprints may be viewed together as one intermittent video. The result is essentially high spatial resolution time lapse airborne or satellite imagery over large areas. This type of product may be created in an automated fashion, onboard the imaging platform, in near real-time, and accessed or viewed in near real-time using wireless communications technology.

Figure 8:
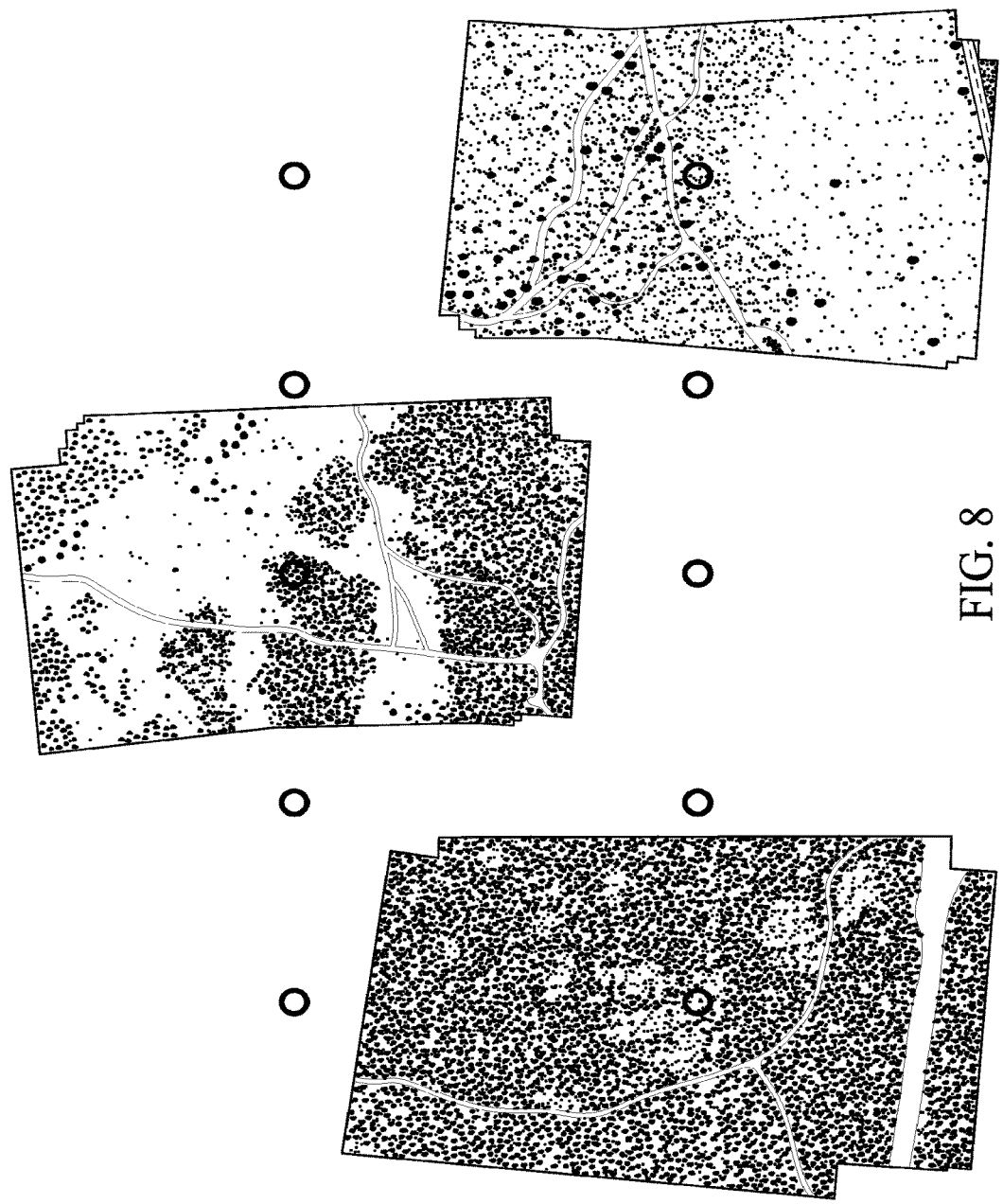
FIG. 8 illustrates an example of the concept of mosaicked or otherwise assembled wide area intermittent video for multiple sensor station locations.

FIG. 8 illustrates the concept of several mosaicked or otherwise assembled intermittent video frames from multiple sensor station locations. This is a hypothetical example, as these image scenes are not actually co-located in this fashion. Ideally, sequences of images for all ten sensor stations would be available, but only three sequences are currently available to the applicants. In this example, WAIV images from FIGS. 3, 6, and 7 have been assembled to create mosaics of wide area intermittent video over a large area. It illustrates the concept that sequences of wide area intermittent video from individual sensor stations may be combined over space to yield wide area intermittent video across large areas, including images from tens or hundreds of sensor station positions that an aircraft visits as part of a regular image collection pattern. The spatial resolution is 3-inch (0.08 m). However, similar products may be created using imagery with more coarse spatial resolution (e.g., thermal imagery with 10 m spatial resolution).

Wide area intermittent video sequences may be created utilizing imagery from the same imaging sensor or multiple imaging sensor with the same design. However, wide area intermittent video sequences may also be generated using multiple sensors with varying characteristics (e.g., sensor size, spectral characteristics, radiometric range, etc.).

Images captured from corresponding sensor stations ideally contain the same scene of interest (e.g., the same footprint or coverage on the ground). For airborne collection, this is effectively accomplished by mounting the imaging sensor into a gyrostabilized mount frame and using inertial measurement units ("IMU") data in order to keep the sensor pointed straight down and to adjust sensor rotation so as to maintain the same orientation during each imaging pass.

The technology described above represents an approach for intermittent airborne/satellite-borne image generation, where time is traded for space. Large areas are imaged with low temporal frequency (e.g., one frame every few minutes or days) instead of small areas being imaged with high temporal frequency (e.g., 30 frames per second) using a sensor staring at one location of interest, as is common with traditional near continuous video used for surveillance purposes. Large area coverage is enabled because a platform (or multiple platforms with imaging sensors) may be continually moving and capturing images over large areas from several sensor stations, only returning to previously visited sensor stations to capture additional images for each video sequence on a relatively infrequent basis.

Applications of Wide Area Intermittent Video

The approach is useful because many applications will benefit from large area video sequences with reduced frame rates. These include, for example: monitoring earth processes (e.g., erosion, ocean current patterns, vegetation growth), natural disaster impacts and recovery (e.g., tsunami), and detection and monitoring the movements of people, vehicles, low-flying aircraft which may loiter or land at clandestine airfields, and animals over periods of minutes. One example application is the use of wide area intermittent video imagery collected in border regions every few minutes to detect smugglers and illegal immigrants traveling by foot across uninhabited, natural environments. This application is described, tested, and evaluated by the inventors in two conference papers: Coulter, L., D. Stow, Y. H. Tsai, C. Lippitt, G. Fraley, and R. McCreight. 2012. Automated detection of people and vehicles in natural environments using high temporal resolution airborne remote sensing. Proceedings of the ASPRS 2012 Annual Conference, Sacramento, Calif., Mar. 19-23, 2012; and Coulter, L., D. Stow, Y. H. Tsai, C. Chavis, R. McCreight, C. Lippitt, and G. Fraley. 2012. A New Paradigm for Persistent Wide Area Surveillance. Proceedings of the IEEE International Conference for Homeland Security Technologies, Waltham, Mass., November 13-15.

Creation of wide area intermittent video sequences using repeat pass imaging may use specific image collection and processing procedures so that images are geometrically consistent and may be co-registered using simple techniques (e.g., automated feature matching and second-order polynomial warping). These specific approaches have been developed, tested, and refined by the applicant, as described herein.

Procedures for collecting and processing FC matched/repeat station images to achieve precise spatial coregistration have been developed, tested, and demonstrated using several imaging platforms and frame array sensors. The applicant has collected time sequential images sets and demonstrated that these images sets when appropriately co-registered generate wide area intermittent video. For example, WAIV sequences have been generated for three sites and at three different spatial resolutions (FIGS. 3, 6, and 7). These sequences included nine to thirteen images collected from an airborne platform. The applicant has created tools to determine which images are from corresponding sensor stations (based upon GPS position at time of capture) and are working to develop tools for automated image co-registration.

Computer System

Methods described herein may be implemented as software and executed by a general purpose computer. For example, such a general purpose computer may include a control unit/controller or central processing unit ("CPU"), coupled with memory, EPROM, and control hardware. The CPU may be a programmable processor configured to control the operation of the computer and its components. For example, CPU may be a microcontroller ("MCU"), a general purpose hardware processor, a digital signal processor ("DSP"), a graphics processing unit ("GPU"), an application specific integrated circuit ("ASIC"), field programmable gate array ("FPGA") or other programmable logic device, discrete gate or transistor logic, discrete hardware components, or any combination thereof designed to perform the functions described herein. A general-purpose processor can be a microprocessor, but in the alternative, the processor can be any processor, controller, or microcontroller. A processor can also be implemented as a combination of computing devices, for example, a combination of a DSP and a microprocessor, a plurality of microprocessors, one or more microprocessors in conjunction with a DSP core, or any other such configuration. Such operations, for example, may be stored in memory and executed by processor hardware.

In some embodiments, the methodologies described herein are modules that may be configured to operate as instructed by a general process computer. In the case of a plurality of modules, the modules may be located separately or one or more may be stored in memory and executed by processor hardware.

While not specifically shown, the general computer may include additional hardware and software typical of computer systems (e.g., power, cooling, operating system) is desired. In other implementations, different configurations of a computer can be used (e.g., different bus or storage configurations or a multi-processor configuration). Some implementations include one or more computer programs executed by a programmable processor or computer. In general, each computer may include one or more processors, one or more data-storage components (e.g., volatile or non-volatile memory modules and persistent optical and magnetic storage devices, such as hard and floppy disk drives, CD-ROM drives, DVD drives, and magnetic tape drives), one or more input devices (e.g., mice and keyboards), and one or more output devices (e.g., display consoles and printers).

Figure 9:
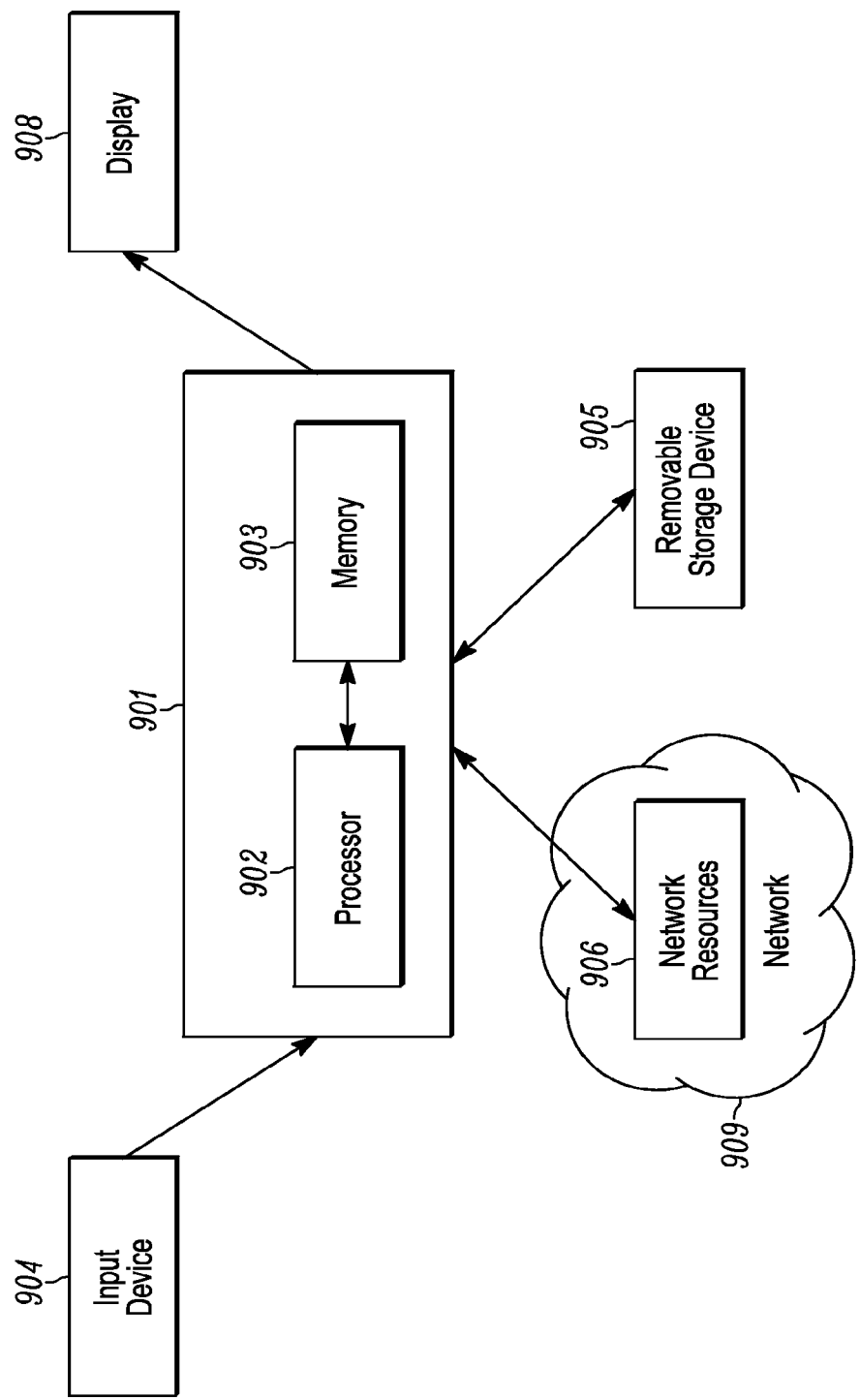
FIG. 9 is a block diagram that illustrates an example of a computer/server system upon which some embodiments of the methods disclosed herein may be implemented.

FIG. 9 is a block diagram that illustrates an embodiment of a computer/server system 900 upon which an embodiment of the methodology may be implemented. The system 900 includes a computer/server platform 901 including a processor 902 and memory 903 which operate to execute instructions, as known to one of skill in the art. Such instructions may include any software modules described herein. The term "computer-readable storage medium" as used herein refers to any tangible medium, such as a disk or semiconductor memory, that participates in providing instructions to processor 902 for execution. Additionally, the computer platform 901 receives input from a plurality of input devices 904, such as a keyboard, mouse, touch device or verbal command. The computer platform 901 may additionally be connected to a removable storage device 905, such as a portable hard drive, optical media (CD or DVD), disk media or any other tangible medium from which a computer can read executable code. The computer platform may further be connected to network resources 906 which connect to the Internet or other components of a local public or private network. The network resources 906 may provide instructions and data to the computer platform from a remote location on a network 907. The connections to the network resources 906 may be via wireless protocols, such as the 802.11 standards, Bluetooth® or cellular protocols, or via physical transmission media, such as cables or fiber optics. The network resources may include storage devices for storing data and executable instructions at a location separate from the computer platform 901. The computer interacts with a display 908 to output data and other information to a user, as well as to request additional instructions and input from the user. The display 908 may therefore further act as an input device 904 for interacting with a user.

The above description of disclosed embodiments is provided to enable any person skilled in the art to make or use described embodiments. Various modifications to the embodiments will be readily apparent to those skilled in the art, the generic principals defined herein can be applied to other embodiments without departing from spirit or scope of the application. Thus, the application is not intended to be limited to the embodiments shown herein but is to be accorded the widest scope consistent with the principals and novel features disclosed herein.

What is claimed is:

1. A method for rapid and automated creation of wide area intermittent video over large areas for human-based visual and computer-based automated movement and change detection using airborne or satellite image frames captured repeatedly from multiple sensor station positions, the method comprising:
   (i) performing sensor position matching between collections;
      wherein the sensor is a digital frame camera with a 2-dimensional array mounted on a manned or unpiloted airborne or satellite platform, and the sensor is in communication with a processor connected to a GPS, GNSS, or other positioning and navigation unit on the manned or unpiloted airborne or satellite platform;
      wherein the collections comprise multi-temporal image acquisition sets, the multi-temporal image acquisition sets comprising a reference image acquisition set and multiple subsequent image acquisition sets that are sequentially later in time than the reference image acquisition set, each of the reference image acquisition set and multiple subsequent image acquisition sets each comprising a sequence of digital images captured from a single flight-line or multiple flight lines, the flight-lines comprising a plurality of sensor station locations, each digital image matched to a sensor station location comprising a GPS, GNSS, or other positioning and navigation unit position and an altitude position and saved to memory before a subsequent image acquisition set is captured, each image acquisition set comprises nadir or oblique images, and each digital image is matched to the GPS, GNSS, or other positioning and navigation unit position within a specified tolerance range of +/−20-50 meters or so that the angular deviation between two lines connecting each actual sensor station location and any individual location within a common area is less than five (5) degrees;
      wherein frequency of capture of each image acquisition set is selected from the group consisting of: no more than 1 capture every 30 seconds, no more than 1 capture every 1 minutes, no more than 1 capture every 5 minutes, no more than 1 capture every 30 minutes, no more than 1 capture every 60 minutes, no more than 1 capture every 8 hours, no more than 1 capture every 24 hours, no more than 1 capture every week, no more than 1 capture every month, no more than 1 capture every year, and no more than 1 capture every 10 years;
   (ii) performing image co-registration of each reference sensor-station matched digital image with each subsequent sensor-station matched digital image from the same sensor station location;
      wherein image co-registration comprises the steps in sequence of (1) feature matching, (2) geometric transform (warping) model estimation, and (3) image re-sampling and transformation;
      wherein the step of feature matching comprises identifying four or more non-orthorectified reference control points within each reference sensor-station matched digital image, and aligning the four or more non-orthorectified reference control points with four or more non-orthorectified subsequent control points of each subsequent sensor-station matched digital image from the same sensor station location;
      wherein the step of geometric transform (warping) model estimation comprises estimating and fine-tuning a transformation model based on the four or more non-orthorectified reference control points and calculating a residual error to the four or more non-orthorectified subsequent control points to achieve accurate image registration;
      wherein the step of image re-sampling and transformation comprises converting a grid of pixel values of each subsequent sensor-station matched digital image to a grid of pixel values of each reference sensor-station matched digital image, and outputting a transformed subsequent sensor-station matched digital image;
   (iii) creating a wide area intermittent video selected from a single sensor station wide area intermittent video and a mosaicked multiple sensor station wide area intermittent video, the single sensor station wide area intermittent video created by combining in time sequence a series of sensor-station matched digital images from the same sensor station location, and the mosaicked multiple sensor station wide area intermittent video created by combining multiple image acquisition sets each comprising a sequence of digital images captured from a single or multiple flight-lines and displaying the combined multiple image acquisition sets successively through time in an order in which the multiple image acquisition sets of the digital images were captured; and
   (iv) performing georeferencing to the wide area intermittent video by applying a real-world coordinate to each pixel of the sensor-station matched digital images.

2. The method of claim 1, wherein a frequency of capturing images at each sensor station location is no more than once per 30 seconds.

3. The method of claim 1, wherein the transformation model is a projective or second-order polynomial transformation.

4. The method of claim 1, wherein each of the airborne images captured from the same sensor station location is captured within 50 meters of a pre-determined location of the sensor station location, or so that each of the airborne images captured from the same sensor station location is captured so that the angular deviation between two lines connecting each actual sensor station location and any individual location within a common area is less than five degrees.

5. The method of claim 1, wherein each of the satellite images captured from the same sensor station location is captured so that the angular deviation between two lines connecting each actual sensor station location and any individual location within a common area is less than five degrees.

6. The method of claim 1, wherein each image captured at the same sensor station location has substantially the same natural or artificial (e.g., active illumination) lighting conditions.

7. The method of claim 1, wherein each image is captured using the same or similar sensor.

8. The method of claim 1, wherein successively displaying each set of image frames through time comprises displaying each set of image frames such that the image frames overlap spatially to display a continuous, aggregate image formed by the set of image frames.

9. The method of claim 1, wherein the images have a spatial resolution of about 10 meters or finer.

10. The method of claim 1, wherein the method is automated and the steps are performed using computer program instructions saved to a computer memory and executable by one or more processors in communication with the sensor.

11. The method of claim 1, further comprising the step of overlaying geographic information systems layers with the wide area intermittent video.

12. A system for obtaining wide area intermittent video, the system comprising:
   one or more processors;
   a sensor in communication with at least one of the processors and configured via at least one of the processors to perform the method of claim 1; and a navigation system in communication with at least one of the processors and configured to provide at least one of the processors an approximate location of the sensor.

13. The system of claim 12, comprising a computer comprising one or more processors, memory, storage memory, interfaces, controllers, outputs, and inputs for operating the wide area intermittent video system, and computer program instructions configured to perform the steps of claim 1, saved to memory, and executable by the one or more processors.

* * * * *